United States Patent
Tsiarkezos et al.

(10) Patent No.: US 7,141,290 B2
(45) Date of Patent: Nov. 28, 2006

(54) STITCH-BONDED FABRICS UTILIZING STRETCHABLE SUBSTRATES

(75) Inventors: Stephen H. Tsiarkezos, Elkton, MD (US); Dimitri Peter Zafiroglu, Centreville, DE (US)

(73) Assignee: Xymid, LLC, Petersburg, VA (US)

(*) Notice: Subject to any disclaimer, the term of this patent is extended or adjusted under 35 U.S.C. 154(b) by 172 days.

(21) Appl. No.: 10/725,238

(22) Filed: Dec. 1, 2003

(65) Prior Publication Data

US 2005/0118912 A1    Jun. 2, 2005

(51) Int. Cl.
*B32B 3/06* (2006.01)
*B32B 5/04* (2006.01)
*B32B 5/10* (2006.01)

(52) U.S. Cl. .................. 428/95; 428/96; 428/102; 428/219; 442/366; 442/414

(58) Field of Classification Search .............. None
See application file for complete search history.

(56) References Cited

U.S. PATENT DOCUMENTS

| | | | |
|---|---|---|---|
| 4,704,321 A | 11/1987 | Zafiroglu | |
| 4,773,238 A | 9/1988 | Zafiroglu | |
| 4,876,128 A | 10/1989 | Zafiroglu | |
| 4,998,421 A | 3/1991 | Zafiroglu | |
| 5,187,952 A * | 2/1993 | Zafiroglu | ............ 66/192 |
| 5,308,673 A | 5/1994 | Tochacek | |
| 5,636,393 A | 6/1997 | Zafiroglu et al. | |
| 5,879,779 A | 3/1999 | Zafiroglu | |
| 6,407,018 B1 | 6/2002 | Zafiroglu | |
| 6,423,393 B1 * | 7/2002 | Wildeman | ............ 428/91 |

OTHER PUBLICATIONS

"Chemical Binders" by Michele Mlynar of the Rohm and Haas Company presented at the International Nonwovens Technical Conference in Baltimore, Maryland (2003).

* cited by examiner

*Primary Examiner*—Jenna-Leigh Befumo
(74) *Attorney, Agent, or Firm*—H.T. Than Law Group

(57) ABSTRACT

A stretchable stitch-bonded nonwoven fabric is disclosed herein. The fabric includes a nonwoven substrate having basis weight in the range from about 15 to about 150 g/m$^2$, and density in the range from about 0.02 to about 0.12 g/cm$^3$. The nonwoven substrate is bonded with a binder applied to the outer surfaces of the substrate in a liquid form in a sufficiently uniform manner so that no areas greater than the spaces between stitch insertion points are devoid of binder. The binder constitutes from about 2% to about 25% of the total weight of the sum of binder and nonwoven substrate weight. The substrate is stitch-bonded with yarns arranged in a stitch pattern that allows the stitch-bonded fabric to be stretched in at least one direction by a factor of about 2.5 to about 5.0 without forming local ruptures therein, and wherein the stitch-bonded nonwoven fabric can be washed and dried at least twenty times.

42 Claims, 3 Drawing Sheets

STITCH-BONDED FABRICS UTILIZING STRETCHABLE SUBSTRATES

FIELD OF THE INVENTION

This invention generally relates to stitch-bonded non-woven fabric and a process for making the fabric. More specifically, this invention relates to stitch-bonded fabric that utilizes a stretchable nonwoven substrate.

BACKGROUND OF THE INVENTION

Processes are known for making stretchable stitch-bonded nonwoven fabrics by multi-needle stitching of a fibrous layer with elastic yarn. Earlier patents disclosing such processes include U.S. Pat. No. 4,704,321, which describes stitching and contracting non-bonded plexifilamentary polyethylene sheets, U.S. Pat. No. 4,876,128, which discloses stitching and contracting bonded fibrous layers, and U.S. Pat. No. 4,773,238, which describes stitching a substantially non-bonded web and then contracting the stitched fabric to less than half its original area, among others.

To produce a highly stretchable stitch-bonded fabric by these known processes generally required that the stitched fabric be allowed to contract or gather extensively after the stitching step. The contraction was caused by the retractive power of the elastic stitching yarns. Stitch-bonding with elastic yarns usually was not performed with accurately controlled tensions on (a) the fibrous substrates fed to the stitch-bonding machine, (b) on the elastic yarns fed to the stitching needles and/or (c) on the stitched fabrics leaving the machine. Generally, the stitch-bonding machines were operated with high tensions on each of these components. In addition, the elastic yarns were subjected to increased tension by the action of the stitching needles of the stitch-bonding machine. Accordingly, the yarns arrived at the stitching needles with high elongations and were inserted into the fibrous layer with very little residual stretch remaining in the yarns. The elongation of the stitched yarn usually was quite close to its break elongation.

For example, as described in the '238 patent, the elastic yarns were fed to the stitch-bonding machine with an elongation of 100 to 250%, and then further stretched by the action of the stitching needles. The high elongation and low residual stretch of the elastic yarns in the stitched fabric were evident from the large contraction of the stitch-bonded fabric as it exited the stitching machine, despite a high wind-up tension applied to the exiting fabric, and from the inability of the stitched and contracted fabrics to be stretched much beyond its original stitched dimensions. It was only after the contraction that the fabrics could be stretched significantly.

U.S. Pat. No. 4,998,421 discloses a process for making an elastic stitch-bonded fabric, which does not require large contraction of the fabric after stitching in order to achieve stretchability. The non-woven substrates described in the '421 patent include "substantially nonbonded" webs wherein "the fibers are not generally bonded to each other by chemical or thermal action". To improve durability (e.g., wash resistance, surface stability and abrasion resistance), such substrates are needle-punched or point-bonded or line-bonded. While such actions improve the durability of the substrates, they also reduce the stretchability of the substrates.

U.S. Pat. No. 5,879,779 also discloses stitch-bonded fabrics utilizing "lightly bonded or unbonded nonwovens" stitched with stretchable "POY" yarns. The fabrics can be stretched to a limited degree beyond their original "as-stitched" dimensions making them "moldable." They can also be shrunk, and then stretched. Only point bonded and entangled/spunlaced non-woven substrates are given as examples in the '779 patent. Extensive bonding of the fibers to each other, and extensive distribution of binder among the fibers and onto the surfaces of the fibers are avoided by using liquid chemical binders, sheath binders over high melting fiber cores and the like to prevent over bonding and the resulting loss of stretchability.

There remains a need in the art for stretchable stitch-bonded nonwoven fabrics that utilize the stretchability of the nonwoven substrate and do not require significant contraction of the fabrics after the stitch-bonding process before the fabrics achieve stretchability.

SUMMARY OF THE INVENTION

The present invention is directed to highly stretchable and durable stitch-bonded fabrics.

The present invention is also directed to highly stretchable and wash/dry durable stitch-bonded fabrics that are used as skirts for mattress covers, as well as other uses.

The present invention is further directed to a stitch-bonded nonwoven fabric comprising a nonwoven substrate having basis weight in the range from about 15 to about 150 $g/m^2$ and density in the range from about 0.02 to about 0.12 $g/cm^3$. The nonwoven substrate is bonded with a binder applied to the outer surfaces of the substrate in a sufficiently uniform manner so that no areas greater than the spaces between stitch insertion points are devoid of binder and the binder constitutes from about 2% to about 25% of the total weight of the sum of binder and nonwoven substrate weights. The substrate is stitch-bonded with yarns arranged in a stitch pattern that allows the stitch-bonded fabric to be stretched in at least one direction by a factor of about 2.5 to about 5.0 without forming local ruptures therein, and the stitch-bonded nonwoven fabric can be washed and dried at least twenty times.

In accordance to one aspect of the present invention, the binder when made into a solid strip about 0.5 mm thick can stretch to at least a length of about 1.5× the original length before breaking.

The nonwoven substrate is selected from a group consisting of carded staple web, spunlaid continuous filament web, airlaid staple web. The nonwoven substrate can be entangled and the entanglement can occur before the substrate is bonded with binder, or before stitching.

The binder is applied to the nonwoven substrate dissolved in a liquid solvent, before the nonwoven substrate is stitch-bonded, after the nonwoven substrate is stitch-bonded or after the substrate is stretched. The binder can be activated before or after the substrate is stitched, ore before or after the substrate is stretched.

The binder can constitute a portion of the fibers of the nonwoven substrate, e.g., by being co-extruded with the fiber core or being applied in liquid form as sheaths around the fibers or side-by-side with the fibers of the nonwoven substrate. The nonwoven substrate can comprise at least 40% of fibers with binder constituting a portion of the fibers. The binder can be applied in liquid form or as powder to the nonwoven substrate suspended in a liquid medium. The binder can be applied substantially to the surface of the substrate, by spraying, with a doctor knife, be foaming.

The stitch pattern allows the stitch-bonded fabric to be stretched in the cross-direction. The stitching yarn can be selected from inelastic yarns, textured stretch yarns, elastic yarns and partially molecularly oriented polymer yarns.

In accordance to another aspect of the present invention, the binder when made into a solid strip about 0.5 mm thick can stretch to at most a length of about 1.5× the original length before breaking. This type of binder preferably constitutes from about 2% to about 10% of the total weight of the sum of binder and nonwoven substrate weights.

The present invention is further directed to a process for forming stretchable stitch-bonded nonwoven fabric comprising the steps of (a) providing a nonwoven substrate having basis weight in the range from about 15 to about 150 $g/m^2$, (b) applying and activating a binder to the outer surfaces of the substrate in a liquid form in a sufficiently uniform manner so that no areas greater than the spaces between stitch insertion points are devoid of binder, wherein the binder constitutes from about 2% to about 25% of the total weight of the sum of binder and nonwoven substrate weight, and density in the range from about 0.02 to about 0.12 $g/cm^3$, (c) stitch-bonding the nonwoven substrate with yarns; and (d) stretching the substrate. This process can be executed by executing in the order of step (a), step (b), step (c) and then step (d), or step (a), step (c), step (b) and then step (d), or step (a), step (b), step (d) and then step (c).

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
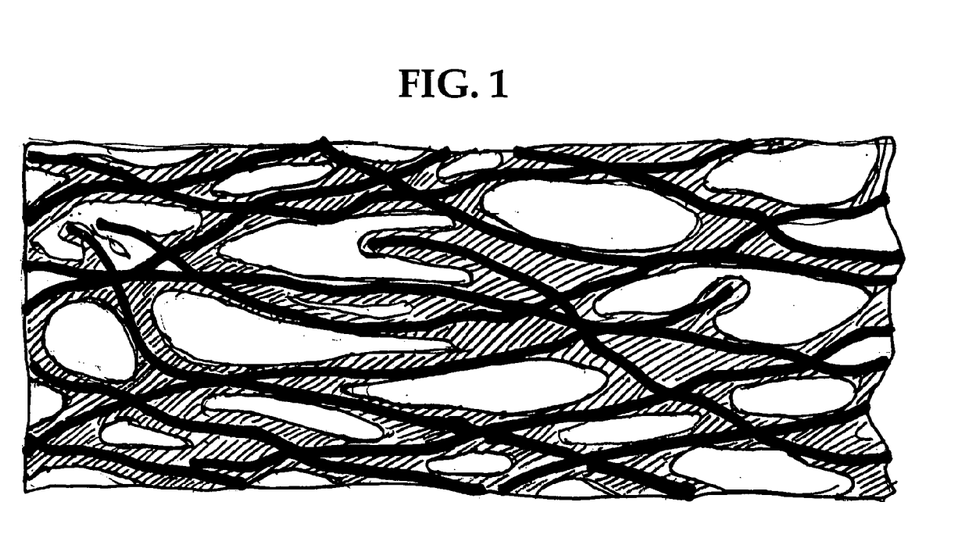
FIG. 1 is a schematic representation of an enlarged area of a stretchable stitched nonwoven fabric in an unstretched state with the stitching yarns omitted for clarity, wherein fibers are bonded with a soft/highly extensible binder at a plurality of the fiber crossover intersection points, and wherein the binder also extends to the fiber spans away from intersection points and occasionally interconnects the fibers along these spans.
Figure 2:
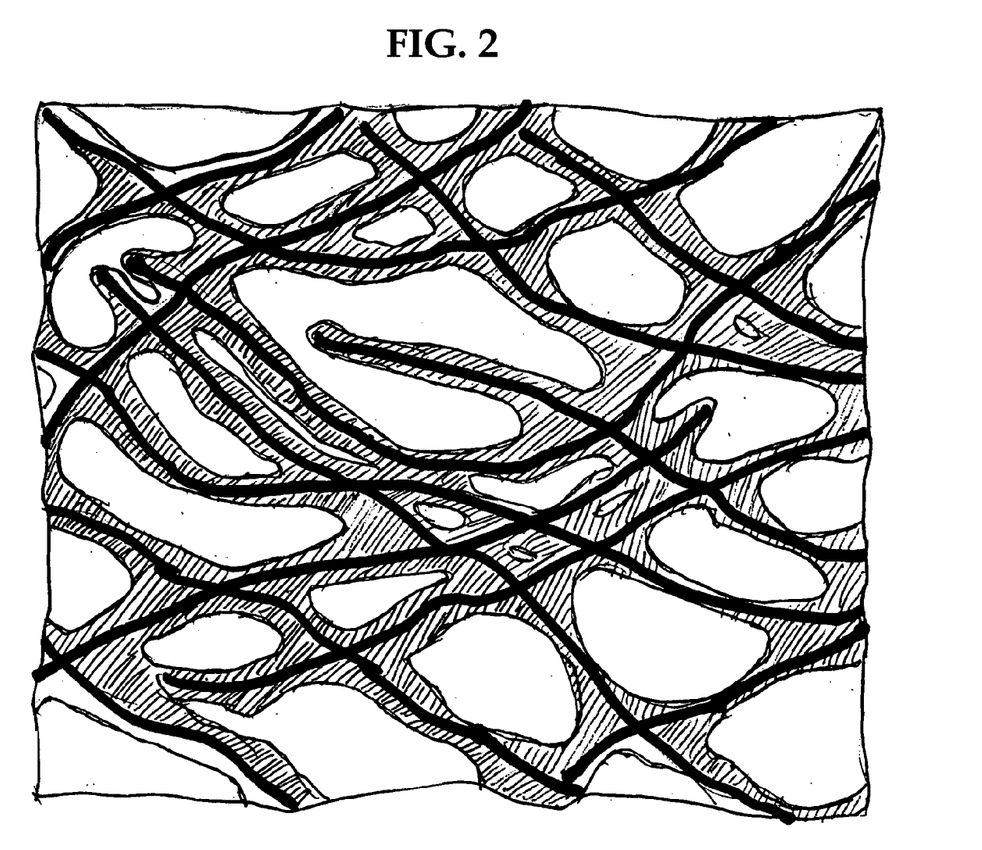
FIG. 2 shows the stitched nonwoven fabric of FIG. 1 in a stretched state wherein the bonds at the intersection points are elongated and deformed, but mostly still intact, and wherein the bonds along the non intersecting fiber spans are either elongated or separated.

FIGS. 1 and 2 refer to cases where there is a relatively high amount of soft/plastic binder at most or all the fiber crossover intersection points as well as at many of the fiber spans between the crossover intersection points, and wherein the binder can be present up to 25% by weight of the bonded web (excluding stitching yarns). The fibers are interbonded at most or all the crossover/intersection points, and also at many of the fiber spans, with the binder or adhesive occasionally bridging across fibers.

FIG. 2 shows that the adhesive can be stretched sufficiently to preserve the majority of the bonds. The stretching action either elongates the bonds along the fiber spans between the crossover points, or separates the bonds along the spans, but not at the crossover intersection points.

Figure 3:
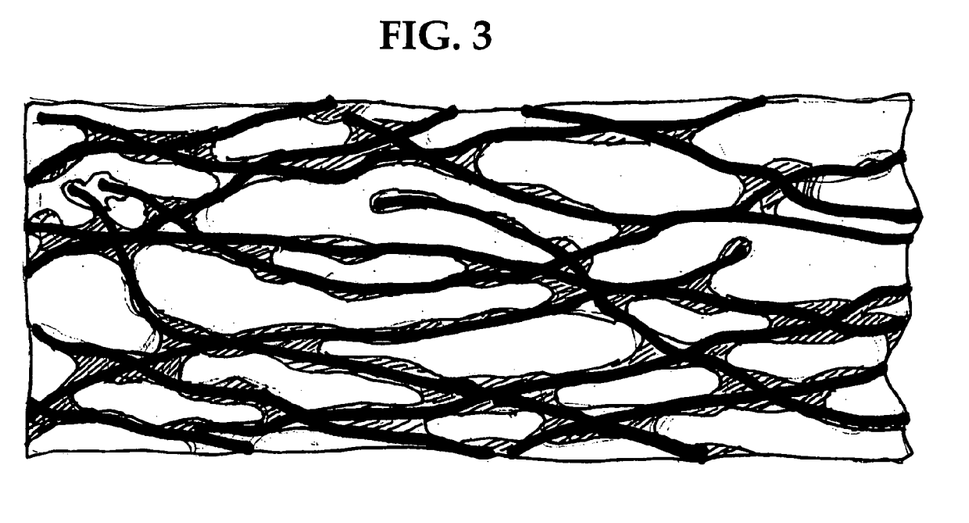
FIG. 3 is a schematic of an enlarged area of a stretchable stitched nonwoven fabric in an unstretched state with the stitched yarns omitted for clarity wherein the fibers are bonded at a plurality of the crossover points, but substantially unbonded along the fiber spans.
Figure 4:
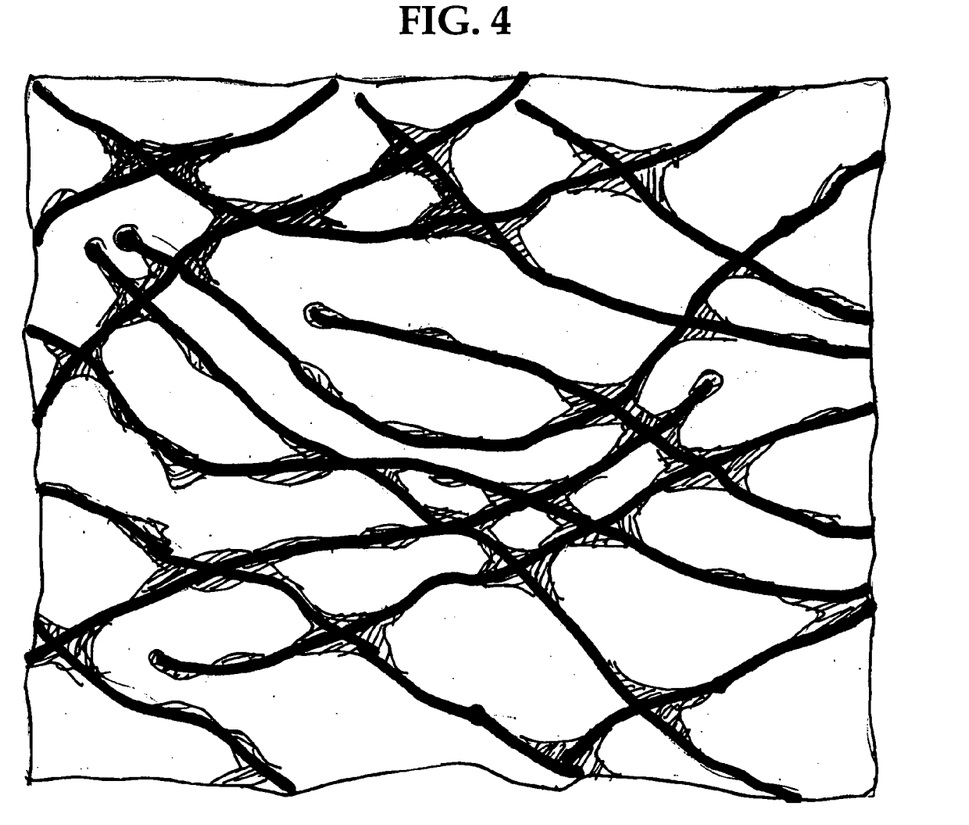
FIG. 4 shows the fabric of FIG. 3 in a stretched state, wherein the bonds at the crossover intersection points are deformed and substantially intact.

FIGS. 3 and 4 show a nonwoven fabric containing less binder, under 10% by weight. The binder is present substantially of the crossover intersection points to bond fibers but is generally insufficient to bond substantially across fiber spans. Therefore, as shown in FIG. 4, when stretched the crossover intersection bonds remain substantially intact. The binder can be hard or soft.

Figure 5:
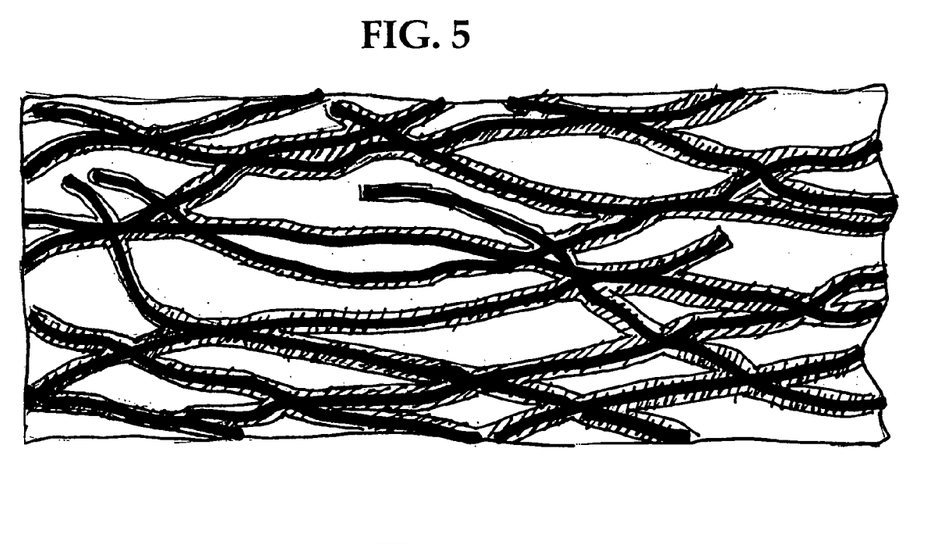
FIG. 5 is a schematic of an enlarged area of a stretchable stitched nonwoven fabric in an unstretched state with the stitching yarn omitted for clarity, wherein the fibers have a relatively uniform presence of binder on their surface throughout the web, and wherein the bonds exist at the crossover intersection points.
Figure 6:
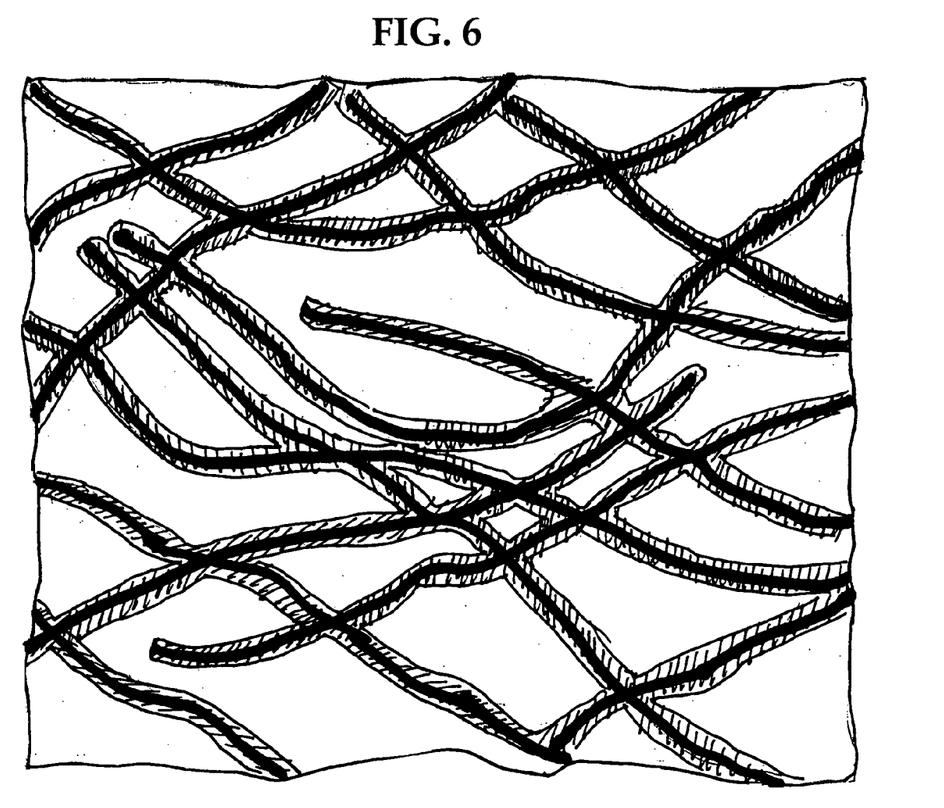
FIG. 6 shows the nonwoven of FIG. 5 in a stretched state.

In FIGS. 5 and 6 the binder is uniformly deposited over the surfaces of the fiber as sheaths over the fiber cores. Alternatively, the binder and the fiber core can be arranged side-by-side. The binder can be co-extruded with the fiber core or can be applied as sheaths in liquid form around the fibers of the nonwoven substrate Bonds form at the crossover intersection points. The bonds are minimally stressed as the web is stretched. The binder can be hard or soft and can amount up to 25% by weight of the web (excluding stitching yarns). The binder is applied before the web is formed on to the surfaces of at least 30%, preferably at least 40%, and more preferably at least 50% of the fibers exposed on the front and back of the fabric by coating the fibers or by co-extruding the binder with the fibers, and substantially all the bonds occur at the crossover intersection points.

Suitable stretchable low density starting nonwoven webs for the present invention include lightly packed or unpacked/uncompressed staple card webs and staple air laid webs. Preferably the fibers have some crimp and randomness to minimize fiber "packing." These webs can be highly stretchable. Fiber packing describes a condition where the fibers make excessive contact with each other either by being parallel and adjacent, or by crossing and contacting each other at very high frequencies. Filament webs and wet-laid webs, which normally have little or no crimp in the fibers, can also be used, so long as the density of the web is relatively low. In all of the embodiments of this invention most or all of the fiber crossover intersection points are interbonded, as it is further explained below.

The starting webs preferably also have a general fiber orientation perpendicular to the direction of the desired stretch, as shown in FIGS. 1, 3, and 5. This orientation allows fiber realignment in the direction perpendicular to the general fiber orientation, as the oblique spaces between the fibers are rebalanced into less oblique and more orthogonal spaces in a pantographing action, as shown in FIGS. 2, 4, and 6. Such action does not excessively stress the bonds at the fiber crossover points. For example, a card web with the fibers generally oriented in the machine direction and therefore crossing each other at very oblique angles create generally elongated rhombic fiber interstices, as show in FIGS. 1, 3, and 5. Such structures are particularly amenable to cross-directional stretch. Another example is a cross-lapped carded structure with the fibers oriented in the cross direction, which, for the same reasons, is stretchable in the machine direction with suitable stitching yarns or stitching system. Such suitable stitching yarns include stretchable yarns discussed below.

Generally, stitching yarn overlaps are oriented in the machine direction and will not allow machine-directional stretch to any significant degree unless the yarns are stretchable. Non-stretchable yarns can, however, can be used in machine stretchable products by being laid-in, because laid-in yarns have no overlaps, and held with stretchable yarns. It should also be noted that the webs of this invention generally contain non stretchable fibers. If the fibers were stretchable, then the stitch-bonded fabrics can be extended in both machine and cross directions.

The starting nonwoven webs contain binders or adhesives distributed throughout the webs in a manner that inter-bonds most of the fibers at the fiber crossover intersection points. The webs can also be lightly pre-entangled before the adhesive-bonding and/or stitch-bonding processes.

Suitable adhesive binders can be highly extensible/soft or relatively inextensible/hard. They preferably include highly extensible soft or plastic thermoplastic adhesives, such as low-molecular-weight polyvinyl acetate dispersions or emulsions (PVA), or soft copolymers of polyesters or polyolefins or polyamides. PVA dispersion is a product of emulsion of polymerization in water of vinyl acetate in the presence of initiator and protective colloid of polyvinyl alcohol. PVA dispersion has the appearance of a viscous white or yellowish liquid. It is resistant to light and oils, and is suitable for use in cloths such as mattress covers. Preferably, the PVA dispersion is plasticized with an amount of less than about 15% plasticizer to prevent the PVA from becoming hard and brittle with age. PVA dispersions are commercially available under tradenames ULTRAFLEX, Ehlermann LB-Super and Planatol etc. Soft adhesives can be selected from a large variety of materials, depending upon end use needs.

Other suitable binders include latex binder, which has been widely used with nonwoven fabrics. Generally, a latex binder is the free radical polymerization product of monomers, which is stabilized in water by surfactants. Latex binder is a colloidal dispersion known as emulsion polymer. Suitable latex binders include acrylic, styrene acrylates, vinyl acetate, vinyl acrylic, ethylene vinyl acetate (EVA), styrene butadiene rubber (SBR), polyvinyl chloride (PVC) and ethylene vinyl chloride.

In accordance to one aspect of the present invention, the softness of the latex binder depends on the glass temperature (Tg) of the starting monomers. In one embodiment, Tg should be lower than the temperature under which the binders is applied to the nonwoven substrate, e.g., about 80° C. or less. Suitable starting monomers include ethylene, butadiene, butyl acrylate, vinyl acrylate and vinyl chloride. As discussed above, soft binders are usable with the embodiment shown in FIGS. 1 and 2. Monomers with higher Tg can also be used with the other embodiments of the present invention, e.g., FIGS. 3–4 and 5–6. Softness along with molecular weight also contributes to the elasticity of the latex binder. Elastic latex binders include rubber (copolymer of acrylonitrile and butadiene) and other binders containing butadiene, butyl acrylate and 2-ethyl hexyl acrylate. Latex binders used in nonwoven fabric are discussed in "Chemical Binders" by Michelle Mlynar of the Rohm and Haas Company presented at the International Nonwovens Technical Conference in Baltimore, Md. (2003).

The adhesives can be applied and finely distributed to cover most or all of the surfaces of the fibers. The adhesives can be in the form of a liquid or liquefied spray or dip, or as liquid suspensions, or intimate blends of very fine powders, pulps, or fibrils. Fine solid forms of adhesives are preferably carried by liquids to achieve binder penetration into the fiber crossover points. The amount of added adhesives can range between about 2% and about 25% of the total weight of the "bonded" starting nonwoven webs, depending upon the stretchability and softness of the binder.

Suitable pre-bonded nonwoven webs can be obtained using dissolved soft chemical adhesive binders, such as the type used in preparing commercial carded "batting" made from card webs or from cross-lapped webs that may be lightly needle-punched. Product Styles 225 and 235 by Sommers Inc. of Coral Gables, Fla., which are card webs bonded with soft/and relatively flexible chemical binders and have a relatively low density, are suitable for use with the present invention.

In accordance with another aspect of the present invention, card webs or lapped webs sprayed with adhesive binders that are stiffer/less flexible and less plastic at relatively low levels, such as about 2% to about 5–10% of the total pre-bonded nonwoven weight, are also suitable. These harder binders can also be in the form of very fine powders, fibrils or pulps that are highly distributed among the fibers, and reach most or all of the fiber crossovers, at least along the outer surfaces. Co-spun low melting polymers as in the case of "sheath-core" fibers illustrated in FIGS. 5 and 6 or "side-by-side" binder and fiber core arrangement are also suitable for the purposes of this invention. These binders are usually polymers such as polyethylene, polypropylene, lower-melting polyesters, polyamides, and the like. Latex binders polymerized from monomers with high glass transition temperature, such as methyl methacylate styrene and acrylonitrile can also be used.

In some embodiments of this invention, the adhesive binder is distributed over essentially all the surface fibers (see FIGS. 1, 2, 5 and 6) but may be diluted or absent among the fiber segments in the middle of the web thickness (see FIGS. 3 and 4). In other embodiments, the web can contain no binder or the binder is not activated before stitching.

Binder (up to about 25% for "highly plastic" soft/binders, and up to 10% for stiffer binders) can be applied or activated after stitching, or after the fabric is stretched by about 2.5 to about 5 times in at least one direction. Chemical binders can be applied by spraying, foaming or padding and other common methods to the stitched or stretched nonwoven fabric. Thermoplastic powder binders can also be applied after they are dispersed in a liquid carrier. Powder may also be pre-tacked onto the starting web without full activation. Fibers with a co-spun soft cross-sectional segment of low-melting binder copolymer (such as a low-melt sheath over a high-melt core, a low-melt segment on part of the cross-section exposed to the outside, etc.) can be activated before, or after stitching and stretching.

The binder can be added or activated before or after stitching and/or stretching (e.g., post-bonded), so long as (i) the density of the nonwoven is between about 0.1 and 0.12 g/cm$^3$, (ii) adhesive binder is present at most of the fiber crossover points at least on the outer surfaces of the stitched web, and preferably throughout the web, (iii) the overall binder level is between about 2% and about 25% of the total weight of the pre-bonded nonwoven web, (iv) the web weight is between 15 and 150 g/m$^2$ without yarns, and/or (v) the stitching pattern allows a stretch of about 2.5 times to about 5.0 times (or about 150% to 400%) in at least one direction, as discussed below.

Referring again to FIGS. 1 and 2, a web of staple or filament fibers is pre-bonded using a very soft and highly deformable (highly plastic) adhesive binder. The activated adhesives of this embodiment can be stretched to about 1.5 times their original length before breaking if formed into a 0.5 mm thick strip. Thus, these adhesive binders, which can be either thermoplastic or thermoset, have a high level of plasticity. The bonded web is relatively light, e.g., having basis weight in the range of 15–150 g/m², such that the number of superposed fiber layers is low, and individual fibers are connected within only a few layers rather than in a tight three-dimensional network. The bonded web is also preferably bulky, e.g., having a density in the range of about 0.02 and 0.12 gm/cm³. The low basis weight and bulkiness of the web create relatively large distances between the crossover points, and the bonds provided by the plastic binder impart limited strength to the bonded web. These conditions allow the bonds to deform extensively without allowing the crossover points from totally separating from each others. The bonds between relatively parallel fiber spans can break as the fabric is stretched, while the bonds at the crossover points of fibers remain intact. Consequently, the fibers can move and re-orient with respect to each other without totally separating.

In accordance to another embodiment shown in FIGS. 3 and 4, stiffer adhesive binders can be used at lower amounts with the low density, low basis weight webs described above. Stiffer adhesive binders, as used herein, include those that cannot be stretched more than 1.5× their original length when formed into a 0.5 mm thick strip before breaking. These adhesive binders tend to concentrate sufficiently at the fiber crossover points and cannot sufficiently resist the separation of fiber spans away from the crossover points.

In still another embodiment, shown in FIGS. 5 and 6, the binder is very uniformly deposited on most or all the fibers and the bonds therefore form only at the crossovers since the density is low and the fibers typically do not touch elsewhere. Binder hardness is not critical, and binders can amount to up to 25% of the web irrespective of hardness.

In accordance to the present invention, the bonds at the crossover points may be strained or even partially separated but would survive the stretch, so long as the stretch is controlled by the stitched yarn network. The stretch and strength of the stitch-bonded web are controlled by the yarn network. For example, the strength of a highly machine-oriented card web is relatively low, especially in the cross direction, and needs to be supplemented or supported by the stitched yarn system. Surface integrity of the web is sufficient to render the stitched and stretched products fully durable for wash/dry and pilling resistance. Card webs become stronger in the machine direction but gain little or no strength in the cross-direction after bonding. For other more balanced webs where the fibers are oriented in all directions, such as air laid webs, a modest gain of unstitched nonwoven strength is obtained in either direction.

The inventors have observed that when binders (albeit soft, flexible, plastic or limitedly applied in small quantities) are distributed among most of the fibers on the surface of the nonwoven web, the tendency of fibers to "rub-off" from the surface is reduced. Fibers may slide or move, but due to the presence of adhesive in most or all of the fiber crossover points on the outer surfaces, the fibers remain attached to the surface of the web. However, the bonded web has localized weak spots. The web cannot be stretched to the limits of its stretchability, because it tends to fail randomly and prematurely at weak (low weight) spots, which are common to nonwoven webs.

To overcome the limited strength and the premature random separation at weak spots the bonded web is stitch-bonded by a yarn network that allows very high levels of distributed and controlled stretch between the stitching points. The small web portions spanning the stitching points are expanded equally and only to the extent allowed by the yarn network. The ultimate strength of the web is provided and controlled by the stitched yarn network. The stitch-bonded, nonwoven fabrics in accordance to the present invention possess high stretchability, and at the same time high wash durability and pilling resistance. These fabrics may be elastically recoverable or not recoverable, depending upon the elasticity of the stitching system. Suitable yarns include, but are not limited to, (i) highly inextensible yarns such as hard of flat yarns, (ii) non-elastomeric stretch yarns such as textured yarns that have crimps formed on the yarns or stretch yarns that are covered by textured yarns (iii) elastomeric yarns such as Lycra® and (iv) partially orientated non-elastomeric yarns.

In one embodiment, the stitching system utilizes elastomeric yarns, as discussed in U.S. Pat. No. 4,998,421, which is incorporated by reference in its entirety. One or more stitching yarn systems can be used and can be fed to one or more needle bars. The yarns form the spaced-apart rows of stitches in the stitch-bonded fabric. Suitable elastomeric yarns are spandex or Lycra® yarns, rubber, elastic yarns covered or wrapped with hard yarns (e.g., Lycra® covered with nylon), and the like. The elastic yarns of the type suitable for embodiments using the techniques of the '421 patent should be capable of an elastic stretch of at least 100% in order to provide the desired elastic stretchability to the stitch-bonded fabric. Thus, in accordance with one embodiment of the invention, the elastic yarns have a residual elastic stretchability of at least 100%, preferably at least 150%, and most preferably at least 200%, as stitched in the fabric. To achieve such a high residual elastic stretch, the elastic yarns have break elongations of at least 300%, preferably in the range of 400 to 700%, and are deployed under low tensions during the stitch-bonding process. This is accomplished with stitch-bonding machines equipped with accurate feed-yarn controls for each needle bar, and accurate speed and tension controls for feeding the starting fibrous layer and withdrawing the stitch-bonded product. The starting fibrous layer preferably is overfed a small amount (e.g., 2.5 to 10%). When high machine direction stretch is desired in the final product, the starting layer is overfed more (e.g., 25 to 30%). The desired low tension conditions are achieved by feeding the elastic yarns at a low enough tension to assure that the elastic yarns have a "residual stretch," e.g., no less than 100% as the yarn arrives at the stitching needles. A companion non-elastic (or "hard") yarn, fed with the elastic yarn itself (e.g., an elastic yarn covered with a hard yarn) or as a hard yarn from a secondary yarn system, can improve stitching continuity and facilitate the use of very low tensions in the elastic feed yarns. A secondary hard yarn system also helps reduce unraveling. The secondary hard yarn also assists in pulling the fibrous layer through the stitch-bonding machine without putting excessive elongation into the elastic feed yarn. The use of secondary yarns is illustrated in the Samples 1, 2, 3 and 6 of the examples discussed in the '421 patent.

A wide variety of conventional warp-knitting stitches can be employed in accordance with the process of the present invention to stitch-bond the fibrous layer with the elastic yarns and/or the secondary hard yarns. The elastic yarns can also be laid-in in a wide variety of ways. The examples below illustrate several preferred repeating stitch patterns for the yarns. Conventional numerical designations are used for the stitch patterns formed by each needle bar.

In another embodiment, partially molecularly oriented yarns are used as the stitching yarns, such yarns are fully disclosed in U.S. Pat. Nos. 5,879,779 and 6,407,018 B1, which are incorporated herein by reference in their entireties. As used herein, the term "fiber of partially molecularly oriented polymer" means fiber of synthetic organic crystalline polymer that has substantial molecular orientation, but which still can achieve further molecular orientation. Yarn of partially molecularly oriented fiber, sometimes referred to herein as "POY", is suited for use as stitching thread in the present invention and typically has a break elongation in the range of 50 to 150%. Conventional fibers of synthetic organic crystalline polymer, such as fibers of polyester or polyamide, typically are fully drawn when used as stitching yarn and have break elongations in the range of 15 to 35%. The term "fiber" includes within its meaning filaments and staple fibers. The term "heat set temperature" refers to the temperature at which a stitch-bonded fabric of the invention is heat treated, while being held at fixed dimensions, usually for no more than 90 seconds, to stabilize the dimensions of the fabric. As a result of such heat setting, the partially molecularly oriented polymer of the stitching yarn fibers becomes more oriented and the break elongation of the heat-set stitching yarn is decreased to less than 50%. In accordance with the invention, at least one of the patterns of stitches was formed with stitching thread that consists essentially of POY fiber.

Typical synthetic organic polymers suitable for the POY fibers include 66-nylon, 6-nylon, polyethylene terephthalate, polybutylene terephthalate, cationic dyeable polyester, and the like. POY fibers are usually made by a high-speed melt-spinning operation and typically are used as a feed yarn for making draw-twist textured yarns. Stitching thread of POY fiber typically has the capability of significant shrinkage when subjected, without restraint, to a low temperature heat treatment. For example, many POY yarns can shrink to less than half its original length when immersed in boiling water. Also, typical POY fiber can be heat set, while being held at constant dimensions, at temperature that is in the range of 120 to 190° C. The higher portion of the heat-setting temperature range (e.g., 165 to 190° C.) is preferred because the higher temperatures permit shorter exposure times to set the synthetic organic polymeric fibers.

A wide variety of stitch patterns of POY stitching thread, and optionally other stitching threads, can be present in the stitch-bonded fabrics to provide considerable versatility. The stitch-bonded nonwoven fabrics can be stretched at room temperature or while heated. When stretched at room temperature, the amount of linear stretch typically is no greater than 50%, and usually is in the range of 20 to 30%. When heated, the amount of linear stretch can be as great as 300% or more and the planar area of the fabric can be increased to an area that is greater than 3.5 times the as-stitched area. The amount that the fabric can be stretched or shrunken depends on, among other things, the stitch pattern employed, whether the fabric includes inelastic drawn yarns in some accompanying stitch pattern in the fibrous layer, and the temperature at which the stretching or shrinking is performed. Importantly, the fabric can be heat set in an as-stitched, as-shrunken, or as-stretched condition to provide a dimensionally stable, inelastic fabric. In another preferred embodiment, the as-stitched fabric is stretched by at least 25% in its longitudinal and/or transverse dimension and then heat set-while in the stretched condition.

When extensibility is required only in the cross-direction, the stitching system may utilize inextensible hard or flat yarns or non-elastomeric stretch texture yarns stitched in with highly cross-extensible stitch patterns, such as a "Ripple" pattern (1-0,1-0,1-2,1-2), or an "Atlas" pattern (such as 1-0,1-0,2-1,2-1,2-3,2-3,1-2,1-2), or even a single-spaced Tricot pattern (such as 1-0,1-2). Such stitch patterns allow extensive cross stretching, especially when used in conjunction with relatively close-spaced and long (high gauge and low CPI) stitches. In these applications the web should have a general machine directional fiber orientation to allow extensive cross stretching. Carded staple webs are generally ideally suitable in these types of applications.

EXAMPLES

All examples described below utilize the same stitching system, which consists of a highly extensible or expandable ripple stitch, at 14 gauge and 9 cpi, using 140 denier/34 filament textured non-stretchable commercial polyester yarns. In other words, the bars of the needles are spaced at 14 needles per 25 mm in the cross-machine direction, and are inserted at 9 stitches or courses per 25 mm (1 inch) in the machine direction. This stitch system allows stretching in the cross direction up to about 4.5 times the original width. All products are tested by affixing a sample 30 cm long and 20 cm wide onto two parallel clamps and pulling apart to a width of 75 cm (3.8 times or 280% cross-stretch). The test is judged successful if no holes develop in the substrate, and the final product is wash-dry durable. Stretchable yarns (such as elastomeric or POY yarns), utilizing less extensible stitching systems, can be substituted for the inextensible yarns utilized in the following examples, with similar results.

All of the examples below also utilize a carded nonwoven web that is highly stretchable or extensible in the cross direction. It is recognized that other webs such as air-laid random webs or spun-laid filament webs could be utilized to allow more stretch in the machine direction. Such webs are preferably used in conjunction with stretchable yarns (elastomeric or POY) to allow sufficient stretch in the machine direction.

Example Group 1

Soft/Plastic Binders Added to Web at Normal Levels, 10–25%

Example 1

Comparative A

A card web of 1.5 denier 1.5 inch polyester with a specific weight of about 0.7 oz/yd$^2$ commercial staple yarns (Wellman Type 310) was carded and lightly pressed to consolidate sufficiently to process in a stitch-bonder. Its density was about 0.034 g/cm$^3$ with a thickness of about 0.7 mm. The product contained no binder and was not pre-bonded.

The stitched fabric was highly bulked by the stitching action. It can be expanded in the cross direction easily without developing holes, however it was not durable. The stitched fabric pilled and disintegrated readily when it was washed and dried once.

Example 1

Comparative B

The nonwoven web used was Style 225 from Sommers, Inc. discussed above. This web has a basis weight of about 2 oz/yd$^2$, and a thickness of about 0.5 mm. Its density is relatively high or about 0.014 g/cm$^3$.

The unstitched product developed holes when stretched in the cross direction.

Example 1A

Commercial rubber cement binder under trademark "Gorilla Cement" was diluted 20 parts of tricholoroethylene solvent and sprayed onto the web of Example 1: Comparative A, on each side. The binder was approximately 18% by weight of the total binder and web system excluding yarns. The product's basis weight was 0.85 oz/yd$^2$ after bonding with a thickness of 1.4 mm excluding yarns. The density of the bonded web was at 0.021 g/cm$^3$ excluding yarns. The unstitched product developed holes when stretched in the cross direction. The stitched product stretched well without developing holes, and it was durable, i.e., resistant to pilling and disintegration after 20 washings and dryings.

A 0.5 mm strip of the dried rubber cement used in this example can be stretched to about 220% before breaking.

Example 1B

The sample is similar to Example 1A, except that Style 225 from Sommers, Inc. was used as the substrate. The product's basis weight was 0.70 oz/yd$^2$, The stitched normal product stretched without developing holes, and it was durable, i.e., resistant to pilling and disintegration after 20 washings and dryings.

Example Group 2

Low-levels of Harder, Non Plastic Binders

Example 2A

Latex adhesive binder typically used in carpet manufacturing was diluted with 50 parts of water and sprayed on both sides of the nonwoven web discussed in Example 1: Comparative A, and dried. The binder content was approximately 2.5% of the total weight of the bonded web. The total weight of stitch-bonded web was 0.75 oz/yd$^2$. The thickness was bout 1.3 mm, and the density was about 0.02 g/cm$^3$. The stitched product stretched without developing holes, and it was durable, i.e., resistant to pilling and disintegration after 20 washings and dryings.

A 0.5 mm dried strip of this binder can stretch to only about 1.15× of its original length before breaking.

Example 2

Comparative A

The adhesive binder used in Example 2A was diluted with only 5 parts of water. The final binder content was approximately 25% of the total weight of the bonded web. The density was about 0.028 g/cm$^3$. Holes developed when the stitched or unstitched fabric was stretched.

Examples 2B

This sample is similar to Example 2A, except that the binder was applied after the nonwoven substrate was stitched. The fabric passed the stretch and durability test.

Example 2C

This sample is similar to Example 2A, except that the binder was applied after the nonwoven substrate was stitched and stretched. The fabric passed the stretch and durability test.

Example 2D

Nylon adhesive binder with a melting point of about 120° C. with particle size in the range of 0–60 microns was suspended in detergent-containing water (~3% powder, 97% water) and sprayed on the binder-free web of Example 1: Comparative A, on both sides. The web/binder product was then treated at 180° C. in an oven for about 1 minute to melt the binder.

The binder content was approximately 5% of the total weight of the bonded web. The total weight of stitch-bonded web was 0.80 oz/yd$^2$. The thickness was bout 1.2 mm, and the density was about 0.023 g/cm$^3$. The stitched product stretched without developing holes, and it was durable, i.e., resistant to pilling and disintegration after 20 washings and dryings.

Example 2

Comparative B

This sample was the same as Example 2D, except that the binder content was about 18% of the total weight. The stitch-bonded fabric failed the stretch test.

Example 2E

This sample was the same as Example 2D, except that the binder was applied after the web was stitched. This sample also passed the stretch and durability tests.

Example 2F

This sample was the same as Example 2D, except that the binder was applied after the web was stitched and stretched. This sample also passed the stretch and durability tests.

Example Group 3

Non-plastic Sheath Binder Around Fiber Core

Example 3A

The nonwoven web used was a card web formed from 100% sheath/core type 254 staple fibers (20% sheath binder). The web was treated at 230° C. in an oven to activate the binder.

The total weight of stitch-bonded web was 0.70 oz/yd$^2$. The thickness was about 0.9 mm, and the density was about 0.0264 g/cm$^3$. The stitched product stretched without developing holes, and it was durable, i.e., resistant to pilling and disintegration after 20 washings and dryings.

Example 3B

This sample was the same as Example 3A, except that the sheath binder was activated after stitching. Web was not pre-consolidated when the binder was heat activated. This sample also passed the stretch and durability tests.

Example 3C

This sample was the same as Example 3A, except that the sheath binder was activated after stitching and stretching. Web was not pre-consolidated when the binder was heat activated. This sample also passed the stretch and durability tests.

Example 3D

This sample was the same as Example 3A except that the nonwoven web comprises 80% sheath/core fibers and 20% 1.5 denier, 1.5 inch cut regular Type 310 Wellman polyester fibers. This sample performed equivalently to Example 3A. There was a very small difference in surface fuzz after 20 washes.

Example 3E

The sample was the same as Example 3A, except that the nonwoven web comprises 40% sheath/core fibers and 60% polyester fibers. This sample passed the stretched and durability text. However, there was more surface fuzz after 20 washes.

Example 3

Comparative A

The sample was the same as Example 3A, except that the nonwoven comprises 20% sheath/core fibers and 80% polyester fibers. This sample did not pass the durability test due to unacceptable surface fuzz after 20 washes.

Example 3

Comparative B

This sample was the same as Example 3A, except that the web was consolidated during the activation of the sheath binder. The thickness was substantially thinner and measured about 0.16 mm, and the density was significantly higher and measured about 0.15 g/cm$^3$.

This sample also did not pass the stretch test.

Durable, stretchable stitch-bonded fabrics made in accordance with the present invention have multiple uses, including using the inventive durable, stretchable stitch-bonded fabrics as side skirts for mattress covers. Bed mattresses are commercially available in various thicknesses. Standard mattresses are generally 7 to 8 inches thick and premium mattresses are generally about 14.5 inches thick. Mattress covers made with the inventive stitch-bonded fabrics as side skirt can be used for both the standard and premium mattresses, since the side skirts will stretch to fit the mattresses. If the stitch-bonded yarns are POY or elastic yarns that retain some elasticity, then the side skirts would elastically hug the mattress. Additionally, elastic bands made from highly elastic yarns can be stitched to the bottom of the skirt away from the top of the mattress covers to pull the skirt below the bottom of the mattresses, as discussed in U.S. Pat. No. 5,636,393.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A stitch-bonded nonwoven fabric comprising
   a nonwoven, substantially unpacked substrate having basis weight in the range from about 15 to about 150 g/m$^2$, and density in the range from about 0.02 to about 0.12 g/cm$^3$, wherein the nonwoven substrate is bonded with a binder applied to the substrate in a sufficiently uniform manner so that substantially no areas greater than the spaces between stitch insertion points are devoid of binder and wherein the binder constitutes from about 2% to about 25% of the total weight of the sum of binder and nonwoven substrate weights, and wherein the substrate is stitch-bonded with yarns arranged in a stitch pattern that allows the stitch-bonded fabric to be stretched in at least one direction by a factor of about 2.5 or more from the as-stitched dimensions without forming local ruptures therein, and wherein the stitch-bonded nonwoven fabric can be washed and dried at least twenty times.

2. The stitch-bonded nonwoven fabric of claim 1, wherein the binder when made into a solid strip about 0.5 mm thick can stretch to at least a length of about 1.5× the original length before breaking.

3. The stitch-bonded nonwoven fabric of claim 1, wherein the stitch pattern allows the stitch-bonded fabric to be stretched in the cross-direction.

4. The stitch-bonded nonwoven fabric of claim 1, wherein the nonwoven substrate is selected from a group consisting of carded staple web, spunlaid continuous filament web, airlaid staple web.

5. The stitch-bonded nonwoven fabric of claim 1, wherein the nonwoven substrate is entangled.

6. The stitch-bonded nonwoven fabric of claim 5, wherein the entanglement occurred before the substrate is bonded with binder.

7. The stitch-bonded nonwoven fabric of claim 5, wherein the entanglement occurred before stitching.

8. The stitch-bonded nonwoven fabric of claim 1, wherein the binder is applied to the nonwoven substrate dissolved in a liquid solvent.

9. The stitch-bonded nonwoven fabric of claim 8, wherein the binder is applied before the nonwoven substrate is stitch-bonded.

10. The stitch-bonded nonwoven fabric of claim 8, wherein the binder is applied after the nonwoven substrate is stitch-bonded.

11. The stitch-bonded nonwoven fabric of claim 1, wherein the binder constitutes a portion of the fibers of the nonwoven substrate.

12. The stitch-bonded nonwoven fabric of claim 11, wherein the binder forms co-extruded or liquid-applied sheaths around the fibers of the nonwoven substrate.

13. The stitch-bonded nonwoven fabric of claim 11, wherein the binder forms co-extruded or liquid-applied a side-by-side portion to the fibers of the nonwoven substrate.

14. The stitch-bonded nonwoven fabric of claim 11, wherein the nonwoven substrate comprises at least 40% of fibers with binder constituting a portion of the fibers.

15. The stitch-bonded nonwoven fabric of claim 14, wherein the nonwoven substrate comprises at least 80% with binder constituting a portion of the fibers.

16. The stitch-bonded nonwoven fabric of claim 1, wherein the binder is applied in a liquid form.

17. The stitch-bonded nonwoven fabric of claim 1, wherein the binder is applied as powder to the nonwoven substrate.

18. The stitch-bonded nonwoven fabric of claim 17, wherein the powder comprises thermoplastic powder and is applied with a liquid suspension medium.

19. The stitch-bonded nonwoven fabric of claim 1, wherein the binder is applied to the substrate before the substrate is stitched.

20. The stitch-bonded nonwoven fabric of claim 1, wherein the binder is applied to the substrate after the substrate is stitched.

21. The stitch-bonded nonwoven fabric of claim 1, wherein the binder is applied to the substrate after the substrate is stretched.

22. The stitch-bonded nonwoven fabric of claim 1, wherein the binder is activated before the substrate is stitched.

23. The stitch-bonded nonwoven fabric of claim 1, wherein the binder is activated after the substrate is stitched.

24. The stitch-bonded nonwoven fabric of claim 1, wherein the binder is activated after the substrate is stretched.

25. The stitch-bonded nonwoven fabric of claim 1, wherein the binder is applied substantially to the surface of the substrate.

26. The stitch-bonded nonwoven fabric of claim 1, wherein the binder is applied by spraying.

27. The stitch-bonded nonwoven fabric of claim 1, wherein the binder is applied with a doctor knife.

28. The stitch-bonded nonwoven fabric of claim 1, wherein the binder is applied by foaming.

29. The stitch-bonded nonwoven fabric of claim 1, wherein the stitching yarn is selected from a group consisting of inelastic yarns, textured stretch yarns, elastic yarns and partially molecularly oriented polymer yarns.

30. The stitch-bonded nonwoven fabric of claim 1, wherein the binder constitutes from about 2% to about 10% of the total weight of the sum of binder and nonwoven substrate weights.

31. The stitch-bonded nonwoven fabric of claim 1, wherein the binder comprises a latex binder.

32. The stitch-bonded nonwoven fabric of claim 31, wherein the latex binder is selected from a group consisting of acrylic, styrene acrylates, vinyl acetate, vinyl acrylic, ethylene vinyl acetate (EVA), styrene butadiene rubber (SBR), polyvinyl chloride (PVC) ethylene vinyl chloride binders, and mixtures thereof.

33. The stitch-bonded nonwoven fabric of claim 31, wherein the latex binder is selected form a group consisting of rubber (copolymer of acrylonitrile and butadiene) and binders containing butadiene, butyl acrylate and 2-ethyl hexyl acrylate.

34. The stitch-bonded nonwoven fabric of claim 1, wherein the latex binder comprises a polymer, which was polymerized from at least one monomer having a glass temperature of about 80° C. or less.

35. The stitch-bonded nonwoven fabric of claim 34, wherein the monomer is selected from a group consisting of ethylene, butadiene, butyl acrylate, vinyl acrylate and vinyl chloride.

36. The stitch-bonded nonwoven fabric of claim 1, wherein the binder comprises polyvinyl acetate (PVA) dispersions or emulsions.

37. The stitch-bonded nonwoven fabric of claim 1, wherein the binder comprises copolymers of polyesters or polyolefins or polyamides.

38. The stitch-bonded nonwoven fabric of claim 1, wherein the binder is applied before the web is formed on to the surfaces of at least 30% of the fibers exposed on the front and back of the fabric by coating the fibers or by co-extruding the binder with the fibers and wherein substantially all the bonds occur at the crossover intersection points.

39. The stitch-bonded nonwoven fabric of claim 38, wherein the binder is present on the surfaces of at least 40% of the exposed fibers.

40. The stitch-bonded nonwoven fabric of claim 39, wherein the binder is present on the surfaces of at least 50% of the exposed fibers.

41. The stitch-bonded nonwoven fabric of claim 1, wherein the bonds between the fibers in the nonwoven substrate partially break and separate where fibers are at a small angle to each other, and remain in place where fibers intersect at larger angles to each other and make direct contact with each other or indirect contact through the binder bridging across as the product is stretched.

42. The stitch-bonded nonwoven fabric of claim 1, wherein the stitch-bonded nonwoven fabric can be stretched by a factor of about 5.0 or less in said at least one direction.

* * * * *